(12) United States Patent
Ohnuki

(10) Patent No.: US 9,882,478 B2
(45) Date of Patent: Jan. 30, 2018

(54) POWER DEVICE

(71) Applicant: HONDA MOTOR CO., LTD., Tokyo (JP)

(72) Inventor: Yasumichi Ohnuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 917 days.

(21) Appl. No.: 14/289,700

(22) Filed: May 29, 2014

(65) Prior Publication Data

US 2014/0361619 A1    Dec. 11, 2014

(30) Foreign Application Priority Data

Jun. 6, 2013    (JP) .................................. 2013-120150

(51) Int. Cl.
H02M 3/158    (2006.01)
(52) U.S. Cl.
CPC .......... *H02M 3/158* (2013.01); *Y10T 307/406* (2015.04)
(58) Field of Classification Search
CPC ....... H02M 3/3382; H02M 2001/0074; H02M 2001/0077; H02M 2001/007;
(Continued)

(56) References Cited

U.S. PATENT DOCUMENTS

2007/0296383 A1*  12/2007  Xu ........................... H02M 1/14
                                                              323/282
2009/0278496 A1    11/2009  Nakao et al.
(Continued)

FOREIGN PATENT DOCUMENTS

EP    2448099 A1    5/2012
JP    2005-224058 A    8/2005
(Continued)

OTHER PUBLICATIONS

German Search Report dated Jan. 15, 2015, issued in corresponding DE Patent Application No. 10 2014 210 347.9 with English translation (17 pages).
(Continued)

*Primary Examiner* — Rexford Barnie
*Assistant Examiner* — Thai Tran
(74) *Attorney, Agent, or Firm* — Westerman, Hattori, Daniels & Adrian, LLP

(57) ABSTRACT

A first direct-current power converter circuit increases an electrical potential difference between a positive electrical potential of a load and a positive electrical potential of a power source by a step-up operation, and a second direct-current power converter circuit increases an electrical potential difference between a negative electrical potential of the load and a negative electrical potential of the power source by a step-up operation. A control device controls switching operations of first and second switching devices included in the first direct-current power converter circuit based on a first duty. The control device controls switching operations of third and fourth switching devices included in the second direct-current power converter circuit based on a second duty. The control device controls a load voltage to be an arbitrary voltage, which is equal to or more than a source voltage.

15 Claims, 10 Drawing Sheets

(58) Field of Classification Search
CPC ......... H02M 2001/008; H02M 3/1582; H02M 3/1584; H02M 2003/075; H02M 3/158
See application file for complete search history.

(56) References Cited

U.S. PATENT DOCUMENTS

| | | | |
|---|---|---|---|
| 2012/0126618 A1* | 5/2012 | Motegi | H02M 3/158 307/43 |
| 2012/0134180 A1* | 5/2012 | Watanabe | H02M 3/1582 363/17 |
| 2013/0154589 A1* | 6/2013 | Lethellier | H02M 1/44 323/271 |
| 2013/0207470 A1 | 8/2013 | Stoev | |

FOREIGN PATENT DOCUMENTS

| | | |
|---|---|---|
| JP | 2006-149054 A | 6/2006 |
| JP | 2009-170620 A | 7/2009 |
| JP | 2011-130573 A | 6/2011 |
| JP | 2013-5649 A | 1/2013 |
| JP | 2013-93923 A | 5/2013 |
| WO | 2012/006746 A1 | 1/2012 |

OTHER PUBLICATIONS

Office Action dated Sep. 13, 2016, issued in counterpart Japanese Application No. 2013-120150, with English translation (5 pages).

* cited by examiner

POWER DEVICE

BACKGROUND OF THE INVENTION

Field of the Invention

The present invention relates to a power device. Priority is claimed on Japanese Patent Application No. 2013-120150, filed Jun. 6, 2013, the content of which is incorporated herein by reference.

Description of Related Art

A DC-DC converter which includes two step-up converters connected in parallel has been known. An inductor included in the DC-DC converter is a magnetic-field cancellation type transformer (for example, refer to Japanese Unexamined Patent Application, First Publication No. 2005-224058 and Japanese Unexamined Patent Application, First Publication No. 2006-149054).

A power converter circuit which includes more than three step-up converters connected in parallel has been known. The power converter circuit reduces a ripple current (for example, refer to Japanese Unexamined Patent Application, First Publication No. 2009-170620).

According to the DC-DC converter in the related art described above, when a step-up ratio (a transformer ratio), which is a ratio of an input voltage and an output voltage, is increased to equal to or more than two, the ripple current passed through the inductor is increased. Therefore, it is necessary to enlarge a device, and thereby the loss of circuit is increased.

Moreover, according to the power converter circuit in the related art described above, the number of the step-up converter connected in parallel is increased, and thereby the number of elements needed to configure the circuit is increased. Therefore, the circuit is enlarged.

The present invention provides a power device which can suppress increase of the number of elements needed to configure a circuit and reduce a ripple current when a step-up ratio (a transformer ratio) is increased.

SUMMARY OF THE INVENTION (1) A power device according to one aspect of the present invention may include a power source, a load configured to be driven by power supplied from the power source, and a voltage control unit configured to control a voltage to be applied to the load. The voltage control unit may include a first reactor and a second reactor, a plurality of switches, a first capacitor and a second capacitor, and a first step-up circuit and a second step-up circuit. A positive electrode of the power source may be connected with a first node, a negative electrode of the power source may be connected with a second node. A first end of the first reactor may be connected with a third node and a second end of the first reactor may be connected with the first node. A first end of the second reactor may be connected with a fourth node and a second end of the second reactor may be connected with the second node. A first end of the first capacitor may be connected with a fifth node and a second end of the first capacitor may be connected with the second node. A first end of the second capacitor may be connected with a sixth node and a second end of the second capacitor may be connected with the first node. The switches may include a first switch, a second switch, a third switch, and a fourth switch. A first end of the first switch may be connected with the fifth node and a second end of the first switch may be connected with the third node. A first end of the second switch may be connected with the third node and a second end of the second switch may be connected with the second node. A first end of the third switch may be connected with the first node and a second end of the third switch may be connected with the fourth node. A first end of the fourth switch may be connected with the fourth node and a second end of the fourth switch may be connected with the sixth node. The first step-up circuit may include the first reactor, the first capacitor, and the first and second switches. The first step-up circuit may be connected with the power source. The second step-up circuit may include the second reactor, the second capacitor, and the third and fourth switches. The second step-up circuit may be connected with the power source. The voltage control unit may be configured to control the voltage applied to the load to be an arbitrary voltage, which is equal to or more than the voltage of the power source, based on a duty of ON and OFF switching operation of the switch.

(2) In the power device described in (1), the voltage control unit may be configured to perform a first switching operation and a second switching operation such that a phase shift is provided between the first and second switching operations. The first switching operation is that the first switch and the second switch of the first step-up circuit are inverted and alternative ON and OFF operations of each first and second switch are performed. The second switching operation is that the third switch and the fourth switch of the second step-up circuit are inverted and alternative ON and OFF operations of each third and fourth switch are performed.

(3) In the power device described in (1) or (2), the first reactor and the second reactor may be magnetically coupled.

(4) In the power device described in (3), the first reactor and the second reactor may be provided to perform a magnetic-field cancellation.

(5) In the power device described in any one of (1) to (4), the first and fourth switches may be configured to interrupt a conduction for charging the power source.

(6) In the power device described in (1), the voltage control unit may further include a third reactor and a fourth reactor, a third capacitor and a fourth capacitor, and a third step-up circuit and a fourth step-up circuit. A first end of the third reactor may be connected with a seventh node and a second end of the third reactor may be connected with the first node. A first end of the fourth reactor may be connected with an eighth node and a second end of the fourth reactor may be connected with the second node. A first end of the third capacitor may be connected with the fifth node and a second end of the third capacitor may be connected with the second node. A first end of the fourth capacitor may be connected with the sixth node and a second end of the fourth capacitor may be connected with the first node. The switches may further include a fifth switch, a sixth switch, a seventh switch, and an eighth switch. A first end of the fifth switch may be connected with the fifth node and a second end of the fifth switch may be connected with the seventh node. A first end of the sixth switch may be connected with the seventh node and a second end of the sixth switch may be connected with the second node. A first end of the seventh switch may be connected with the first node and a second end of the seventh switch may be connected with the eighth node. A first end of the eighth switch may be connected with the eighth node and a second end of the eighth switch may be connected with the sixth node. The third step-up circuit may include the third reactor, the third capacitor, and the fifth and sixth switches. The third step-up circuit may be connected with the power source. The fourth step-up circuit may include the fourth reactor, the fourth capacitor, and the seventh and eighth switches. The fourth step-up circuit may be connected with the power source.

(7) In the power device described in (6), the voltage control unit may be configured to perform first to fourth switching operations such that a phase shift is provided between the first and second switching operations and a phase shift is provided between the third and fourth switching operations. The first switching operation is that the first switch and the second switch of the first step-up circuit are inverted and alternative ON and OFF operations of each first and second switch are performed. The second switching operation is that the third switch and the fourth switch of the second step-up circuit are inverted and alternative ON and OFF operations of each third and fourth switch are performed. The third switching operation is that the fifth switch and the sixth switch of the third step-up circuit are inverted and alternative ON and OFF operations of each fifth and sixth switch are performed. The fourth switching operation is that the seventh switch and the eighth switch of the fourth step-up circuit are inverted and alternative ON and OFF operations of each seventh and eighth switch are performed.

(8) In the power device described in (7), the voltage control unit may be configured to perform the first to fourth switching operations such that a phase shift is provided between a pair of the first and second switching operations and a pair of the third and fourth switching operations.

(9) In the power device described in (7) or (8), the first reactor and the second reactor may be magnetically coupled, and the third reactor and the fourth reactor may be magnetically coupled.

(10) In the power device described in (9), the first reactor and the second reactor may be provided to perform a magnetic-field cancellation, and the third reactor and the fourth reactor may be provided to perform a magnetic-field cancellation.

(11) In the power device described in (6), the voltage control unit may be configured to perform first to fourth switching operations such that a phase shift is provided between the first and third switching operations and a phase shift is provided between the second and fourth switching operations. The first switching operation is that the first switch and the second switch of the first step-up circuit are inverted and alternative ON and OFF operations of each first and second switch are performed. The second switching operation is that the third switch and the fourth switch of the second step-up circuit are inverted and alternative ON and OFF operations of each third and fourth switch are performed. The third switching operation is that the fifth switch and the sixth switch of the third step-up circuit are inverted and alternative ON and OFF operations of each fifth and sixth switch are performed. The fourth switching operation is that the seventh switch and the eighth switch of the fourth step-up circuit are inverted and alternative ON and OFF operations of each seventh and eighth switch are performed.

(12) In the power device described in (11), the voltage control unit may be configured to perform the first to fourth switching operations such that a phase shift is provided between a pair of the first and third switching operations and a pair of the second and fourth switching operations.

(13) In the power device described in (11) or (12), the first reactor and the third reactor may be magnetically coupled, and the second reactor and the fourth reactor may be magnetically coupled.

(14) In the power device described in (13), the first reactor and the third reactor may be provided to perform a magnetic-field cancellation, and the second reactor and the fourth reactor may be provided to perform a magnetic-field cancellation.

(15) In the power device described in any one of (6) to (14), the first, fourth, fifth, and eighth switches may be configured to interrupt a conduction for charging the power source.

According to the power device of the aspect described in (1), the first step-up circuit increases the electrical potential difference between the positive electrical potential of the load and the positive electrical potential of the power source by the step-up operation, and the second step-up circuit increases the electrical potential difference between the negative electrical potential of the load and the negative electrical potential of the power source by the step-up operation. Thereby, for example, a duty needed to achieve a desired step-up ratio can be reduced in comparison with a device that a plurality of step-up converters are connected with a power source in parallel. Moreover, a ripple current can be reduced when a step-up ratio (a transformer ratio) is increased. Therefore, it is unnecessary to enlarge a device, and thereby an increase of loss of circuit is suppressed. Moreover, an increase of the number of elements needed to configure the circuit and an enlargement of the circuit can be suppressed, and the ripple current can be reduced in comparison with a device in which more than three step-up converters are connected with a power source in parallel. Moreover, the voltage resistance of the first and second capacitors can be reduced. Thereby, the entire circuit can be reduced in size.

Moreover, according to the power device described in (2), a ripple frequency of current flowing through each of the load, which includes the capacitors connected in parallel, and the power source can be more than a switching frequency. For example, even if the switching frequency is within an audible band, a frequency of noise caused by the ripple current, which is generated in the load and the power source, is changed into one outside the audible band. Thereby, the noise can be suppressed. In particular, based on the switching operation using an opposite phase, since the ripple of current based on the operation of the first step-up circuit and that of the second step-up circuit are superimposed in the opposite phase each other, the ripple of current flowing through each of the load and the power source can be reduced in comparison with a switching operation using a same phase.

Moreover, according to the power device described in (3), the frequency of each first and second reactor current can be more than the switching frequency. For example, by the opposite phase switching operation, the frequency of each first and second reactor current can be increased to the twice of the switching frequency, and a frequency of magnetostrictive noise generated in the first and second reactors can be increased to outside the audible band.

Moreover, according to the power device described in (4), a generation of magnetic saturation in the first and second reactors is suppressed. Thereby, each element can be reduced in size.

Moreover, according to the power device described in (5), even if the power source is a fuel cell or a power generator which is only capable of discharging power, an appropriate operation can be performed.

Moreover, according to the power device described in (6), the electrical power covered by each step-up circuit can be reduced.

Moreover, according to the power device described in (7) or (11), the ripple frequency of current flowing through each of the load, which includes the capacitors connected in parallel, and the power source can be more than the switching frequency. For example, even if the switching frequency is within the audible band, the frequency of noise caused by the ripple current, which is generated in the load and the power source, is changed into one outside the audible band. Thereby, the noise can be suppressed. In particular, based on the switching operation using an opposite phase, since the ripples of current based on the operations of the first to fourth step-up circuits are superimposed in the opposite phase each other, the ripple of current flowing through each of the load and the power source can be reduced in comparison with a switching operation using a same phase.

Moreover, according to the power device described in (8) or (12), the ripple frequency of current flowing through each of the load and the power source can be further increased.

Moreover, according to the power device described in (9) or (13), the ripple frequency of current flowing through each of the load, which includes the capacitors connected in parallel, and the power source can be more than the switching frequency. For example, by shifting a phase of a first pair of switching operations using an opposite phase from that of a second pair of switching operations using an opposite phase by 90°, the ripple frequency of current flowing through each of the load and the power source can be increased to the four times of the switching frequency. Therefore, the frequency of noise caused by the ripple current, which is generated in the load and the power source, can be increased to outside the audible band.

Moreover, according to the power device described in (10) or (14), a generation of magnetic saturation in the first to fourth reactors is suppressed. Thereby, each element can be reduced in size.

Moreover, according to the power device described in (15), even if the power source is a fuel cell or a power generator which is only capable of discharging power, an appropriate operation can be performed.

DESCRIPTION OF EMBODIMENTS

Hereinafter, a power device according to an embodiment of the present invention will be described with reference to the attached drawings.

The power device according to the embodiment of the present invention provides a direct-current power to a load such as an inverter. The inverter controls a power mode and a regenerative mode of an electric motor which can produce, for example, a drive force to run a vehicle.

Figure 1:
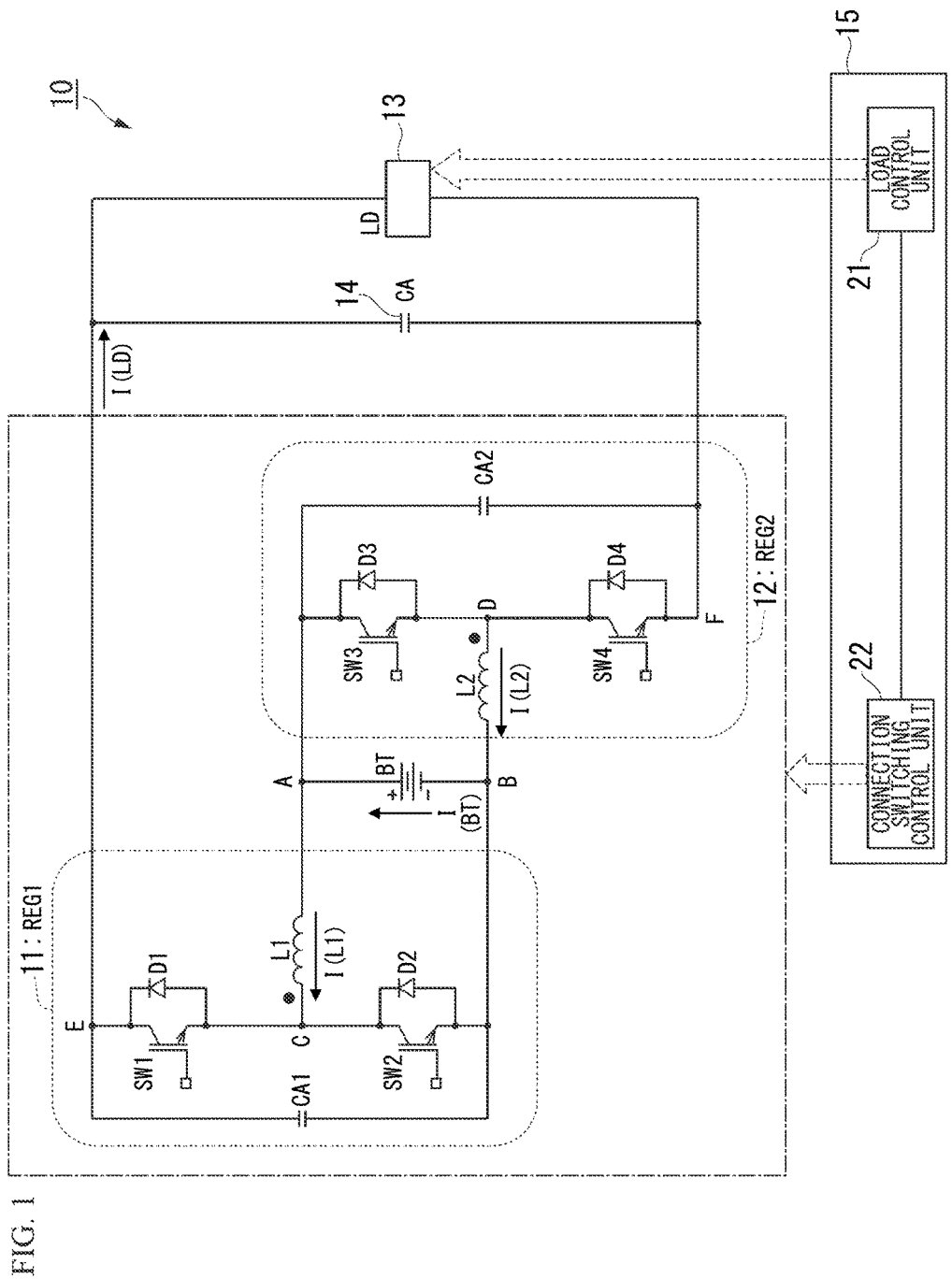
FIG. 1 is a configuration diagram showing a power device according to an embodiment of the present invention.

As illustrated in FIG. 1, a power device 10 according to the embodiment of the present invention includes a power source BT such as a battery, a first direct-current power converter circuit (REG1) 11, a second direct-current power converter circuit (REG2) 12, a load (LD) 13, a capacitor (CA) 14, and a control device 15. The load 13 can drive using a direct-current power supplied from the first and second direct-current power converter circuits 11 and 12, and supply a generated direct-current power to the first and second direct-current power converter circuits 11 and 12. The capacitor (CA) 14 is connected with both ends of the load 13.

The first direct-current power converter circuit (REG1) 11 is connected with the power source BT, and include first and second switching devices SW1 and SW2 such as IGBT (Insulated Gate Bipolar mode Transistor), which configure a first switch group, a first reactor L1, and a first capacitor CA1.

The second direct-current power converter circuit (REG2) 12 is connected with the power source BT, and include third and fourth switching devices SW3 and SW4 such as IGBT, which configure a second switch group, a second reactor L2, and a second capacitor CA2.

The power device 10 includes first to sixth nodes A to F.

A positive electrode of the power source BT is connected with the first node A, and a negative electrode of the power source BT is connected with the second node B. One end of the first reactor L1 is connected with the third node C, and the other end of the first reactor L1 is connected with the first node A. One end of the second reactor L2 is connected with the fourth node D, and the other end of the second reactor L2 is connected with the second node B.

A collector and an emitter of the first switching device SW1 are connected with the fifth node E and the third node C, respectively. A collector and an emitter of the second switching device SW2 are connected with the third node C and the second node B, respectively. A collector and an emitter of the third switching device SW3 are connected with the first node A and the fourth node D, respectively. A collector and an emitter of the fourth switching device SW4 are connected with the fourth node D and the sixth node F, respectively. Diodes D1 to D4 are connected between the emitter and collector of the switching devices SW1 to SW4, respectively. The direction from the emitter to the collector of each switching device SW1 to SW4 is a forward direction of each diode D1 to D4.

The first capacitor CA1 is connected between the fifth node E and the second node B, and the second capacitor CA2 is connected between the first node A and the sixth node F.

The first and second direct-current power converter circuits 11 and 12 are controlled based on pulse-width-modulated signals (PWM signals) output from the control device 15 and input into a gate of each switching device SW1 to SW4 so that the first and second direct-current power converter circuits 11 and 12 drive independently from each other.

In more detail, the first and second direct-current power converter circuits 11 and 12 are controlled so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. In this switching operation, close (ON) and open (OFF) of each switching device SW1 to SW4 are switched alternately.

Figure 2A:
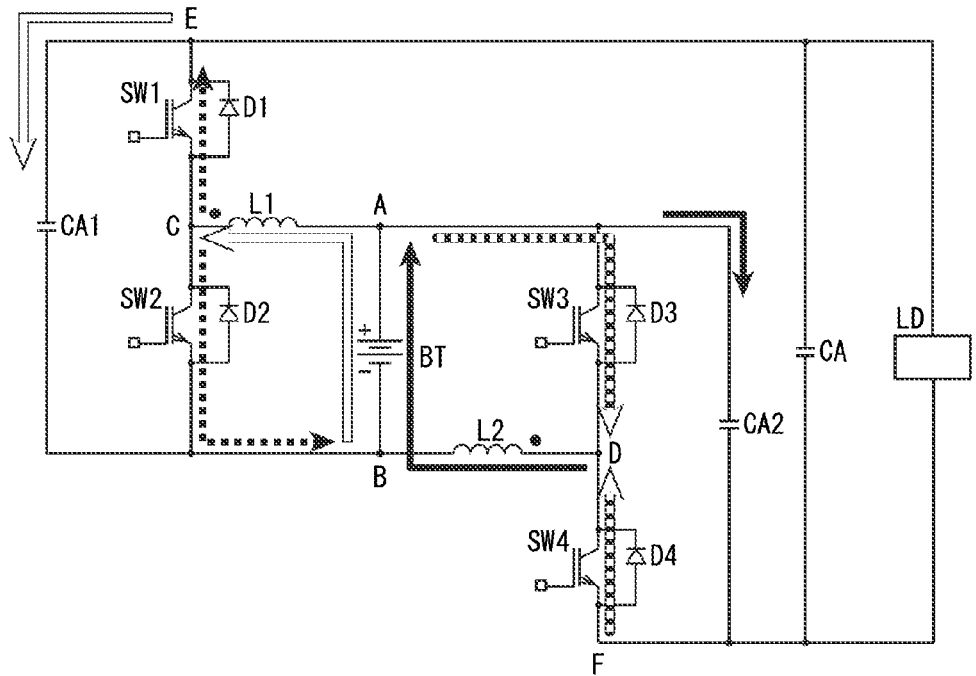
FIG. 2A is a diagram showing ON/OFF of each switching device and a current flow when first and second direct-current power converter circuits included in the power device according to the embodiment of the present invention are in a power mode.

In the first direct-current power converter circuit 11, for example, as illustrated in FIG. 2A, when the first capacitor CA1 is charged in a stopped state of the load 13 (in other words, a state where the load 13 do not perform a power consumption and a regeneration), the first switching device SW1 is turned off and the second switching device SW2 is turned on. Thereby, the first reactor L1 is excited by flowing a circulating current via the power source BT, the first reactor L1, and the second switching device SW2 in series, and a first reactor current I (L1) flowing through the first reactor L1 is increased. On the other hand, by turning on the first switching device SW1 and turning off the second switching device SW2, a current flows into the first capacitor CA1 via the power source BT, the first reactor L1, and the first switching device SW1 and the first diode D1.

Figure 2B:
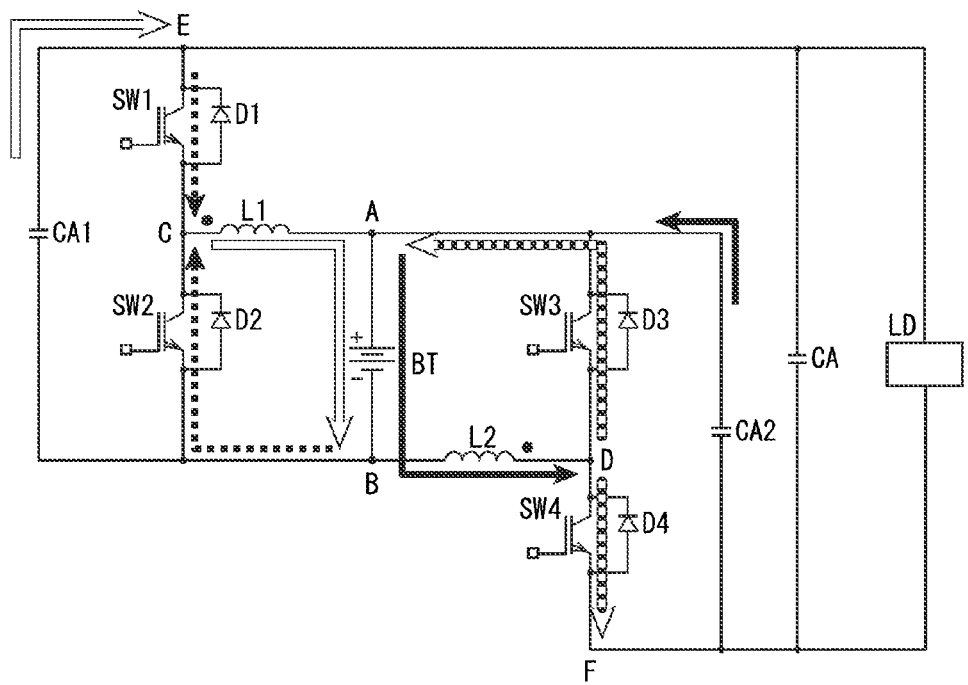
FIG. 2B is a diagram showing ON/OFF of each switching device and a current flow when the first and second direct-current power converter circuits included in the power device according to the embodiment of the present invention are in a regenerative mode.

In the first direct-current power converter circuit 11, for example, as illustrated in FIG. 2B, when the first capacitor CA1 is discharged in the stopped state of the load 13, the first switching device SW1 is turned on and the second switching device SW2 is turned off. Thereby, a current flows via the first switching device SW1, the first reactor L1, and the power source BT in series. On the other hand, by turning off the first switching device SW1 and turning on the second switching device SW2, a circulating current flows via the second switching device SW2 and the second diode D2, the first reactor L1, and the power source BT.

In the second direct-current power converter circuit 12, for example, as illustrated in FIG. 2A, when the second capacitor CA2 is charged in the stopped state of the load 13, the fourth switching device SW4 is turned off and the third switching device SW3 is turned on. Thereby, the second reactor L2 is excited by flowing a circulating current via the power source BT, the third switching device SW3, and the second reactor L2 in series, and a second reactor current I (L2) flowing through the second reactor L2 is increased. On the other hand, by turning on the fourth switching device SW4 and turning off the third switching device SW3, a current flows into the second capacitor CA2 via the fourth switching device SW4 and the fourth diode D4, the second reactor L2, and the power source BT.

In the second direct-current power converter circuit 12, for example, as illustrated in FIG. 2B, when the second capacitor CA2 is discharged in the stopped state of the load 13, the fourth switching device SW4 is turned on and the third switching device SW3 is turned off. Thereby, a current flows via the power source BT, the second reactor L2, and the fourth switching device SW4. On the other hand, by turning off the fourth switching device SW4 and turning on the third switching device SW3, a circulating current flows via the second reactor L2, the third switching device SW3 and the third diode D3, and the power source BT.

The control device 15 includes a load control unit 21 and a connection switching control unit 22.

The load control unit 21 controls the operation of the load 13. For example, if the load 13 includes an electric motor such as a three-phase brushless DC motor and an inverter to control the power mode and regenerative mode of the electric motor, the load control unit 21 controls a power conversion operation of the inverter. In more detail, when the electric motor is in the power mode, the load control unit 21 converts a direct-current power applied between both electrodes at the direct current side of the inverter into a three-phase alternating-current power, performs a commutation of a conduction for each phase of the electric motor sequentially, and thereby, each phase current, which is alternating-current, flows. On the other hand, when the electric motor is in the regenerative mode, the load control unit 21 converts the generated alternating-current power output from the electric motor into a direct-current power, while the load control unit 21 synchronizes based on a rotation angle of the electric motor.

The connection switching control unit 22 can drive the first and second direct-current power converter circuits 11 and 12 independently from each other by inputting signals (PWM signals) based on a pulse width modulation (PWM) into a gate of each switching device SW1 to SW4. The connection switching control unit 22 controls the first and second direct-current power converter circuits 11 and 12 so that a switching operation for at least one of a pair of the first and second switching devices SW1 and SW2 included in the first direct-current power converter circuit 11 and a pair of the third and fourth switching devices SW3 and SW4 included in the second direct-current power converter circuit 12 is performed. Thereby, the connection switching control unit 22 controls a voltage V0 applied to the load 13 (a load voltage) to be equal to or more than a voltage VB applied between terminals of the power source BT (a source voltage).

The connection switching control unit 22 controls a switching operation of the first switching device SW1 and the second switching device SW2 included in the first direct-current power converter circuit 11 based on a first duty DT1. In the switching operation, the first switching device SW1 and the second switching device SW2 are inverted and the alternative close and open (ON/OFF) switching operations of each switching device SW1 and SW2 are performed. As illustrated in the following equation (1), the first duty DT1 is defined by ON time t(SW1) of the first switching device SW1 and ON time t(SW2) of the second switching device SW2.

For example, when the first switching device SW1 is turned on and the second switching device SW2 is turned off, the first duty DT1 is 0%. On the other hand, when the first switching device SW1 is turned off and the second switching device SW2 is turned on, the first duty DT1 is 100%.

The connection switching control unit 22 can step up the source voltage VB based on the first duty DT1 and output the step-up voltage from the first direct-current power converter circuit 11. The connection switching control unit 22 controls output voltage V10 of the first direct-current power converter circuit 11 (in other words, the voltage applied between the fifth node E and the second node B) based on the source voltage VB and the first duty DT1.

$$DT1 = \frac{t(SW2)}{t(SW1)+t(SW2)} = \frac{V10-VB}{V10} \\ V10 = \frac{VB}{1-DT1} \Bigg\} \quad (1)$$

The connection switching control unit 22 controls a switching operation of the third switching device SW3 and the fourth switching device SW4 included in the second direct-current power converter circuit 12 based on a second duty DT2. In the switching operation, the third switching device SW3 and the fourth switching device SW4 are inverted and the alternative close and open (ON/OFF) switching operations of each switching device SW3 and SW4 are performed. As illustrated in the following equation (2), the second duty DT2 is defined by ON time t(SW3) of the third switching device SW3 and ON time t(SW4) of the fourth switching device SW4.

For example, when the fourth switching device SW4 is turned on and the third switching device SW3 is turned off, the second duty DT2 is 0%. On the other hand, when the fourth switching device SW4 is turned off and the third switching device SW3 is turned on, the second duty DT2 is 100%.

The connection switching control unit 22 can step up the source voltage VB based on the second duty DT2 and output the step-up voltage from the second direct-current power converter circuit 12. The connection switching control unit 22 controls output voltage V20 of the second direct-current power converter circuit 12 (in other words, the voltage applied between the first node A and the sixth node F) based on the source voltage VB and the second duty DT2.

$$DT2 = \frac{t(SW3)}{t(SW3)+t(SW4)} = \frac{V20-VB}{V20} \\ V10 = \frac{VB}{1-DT2} \Bigg\} \quad (2)$$

The power device 10 according to the embodiment of the present invention includes the constitution described above. Hereinafter, the operation of the power device 10, in other words, the control operation of the connection switching control unit 22 will be described.

(First Control Mode)

In a first control mode, the connection switching control unit 22 drives one of the first and second direct-current power converter circuits 11 and 12 at a once. Thereby, the connection switching control unit 22 can arbitrarily control the load voltage V0 to be equal to or more than the source voltage VB.

For example, the connection switching control unit 22 makes the power source BT into a connecting condition with the load 13 by turning on the first and fourth switching devices SW1 and SW4 and turning off the second and third switching devices SW2 and SW3.

The connection switching control unit 22 performs a switching operation, which gradually increases the first duty DT1 from zero, while the power source BT is connected with the load 13. Thereby, the output voltage V10 of the first direct-current power converter circuit 11 is gradually increased above the source voltage VB by the back electromotive force of the first reactor L1. Thereby, the capacitor 14 is charged, and the load voltage V0 is gradually increased based on the output voltage V10.

Moreover, the connection switching control unit 22 performs a switching operation, which gradually decreases the first duty DT1 to zero. Thereby, an electrical charge charged in the capacitor 14 is supplied to the power source BT while the electrical charge is consumed in the load 13. Thereby, the power source BT is charged, and the load voltage V0 is gradually decreased based on the output voltage V10. When the first duty DT1 reaches zero, the load voltage V0 is equals the source voltage VB.

Similarly, the connection switching control unit 22 performs a switching operation, which gradually increases the second duty DT2 from zero, while the power source BT is connected with the load 13. Thereby, the output voltage V20 of the second direct-current power converter circuit 12 is gradually increased above the source voltage VB by the back electromotive force of the second reactor L2. Thereby, the capacitor 14 is charged, and the load voltage V0 is gradually increased based on the output voltage V20.

Moreover, the connection switching control unit 22 performs a switching operation, which gradually decreases the second duty DT2 to zero. Thereby, an electrical charge charged in the capacitor 14 is supplied to the power source BT while the electrical charge is consumed in the load 13. Thereby, the power source BT is charged, and the load voltage V0 is gradually decreased based on the output voltage V20. When the second duty DT2 reaches zero, the load voltage V0 is equals the source voltage VB.

(Second Control Mode)

Figure 3:
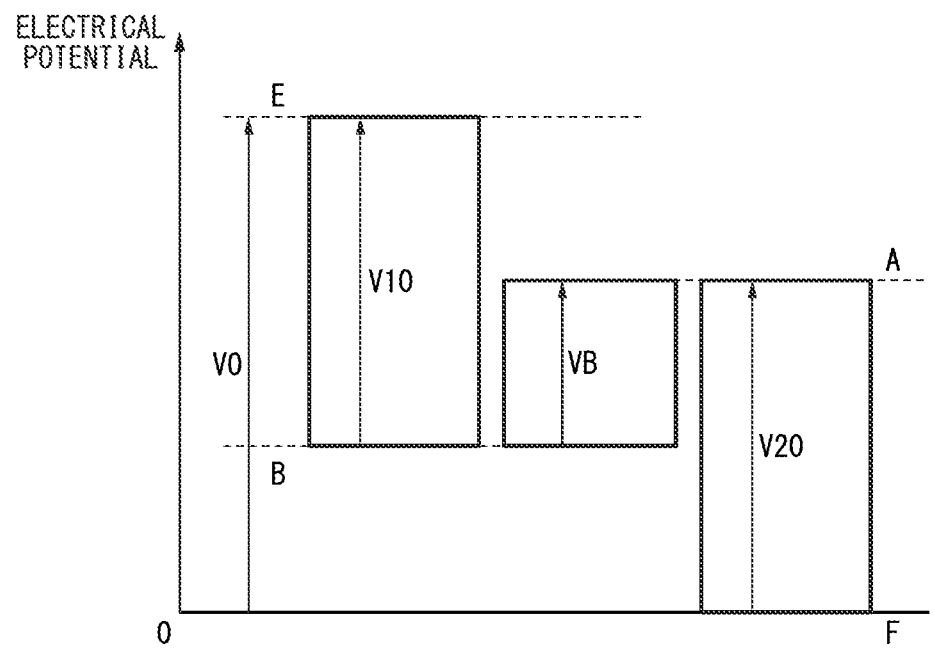
FIG. 3 is a diagram showing a relationship of a load voltage, a source voltage, and each output voltage when the power device according to the embodiment of the present invention is in a second control mode.

In a second control mode, the connection switching control unit 22 simultaneously drives the first and second direct-current power converter circuits 11 and 12. The phase of the switching operation of the first direct-current power converter circuit 11 is the same as that of the second direct-current power converter circuit 12. Thereby, the connection switching control unit 22 can control the load voltage V0 to be equal to or more than the source voltage VB. In this case, a current flowing through the load 13 and the capacitor 14, and the power source BT is generated by combining currents based on the mutual operations of the first and second direct-current power converter circuits 11 and 12. For example, if the first duty DT1 and the second duty DT2 are the same each other, the load voltage V0 is represented by FIG. 3 and the following equation (3).

$$V0 = V10 + V20 - VB = \frac{VB \cdot (1+DT1)}{1-DT1}, \quad (3)$$
$$(DT1 = DT2)$$

For example, the connection switching control unit 22 makes the power source BT into a connecting condition with the load 13 by turning on the first and fourth switching devices SW1 and SW4 and turning off the second and third switching devices SW2 and SW3.

The connection switching control unit 22 performs a switching operation, which gradually increases the first and second duties DT1 and DT2 from zero, while the power source BT is connected with the load 13. Thereby, the output voltage V10 of the first direct-current power converter circuit 11 and the output voltage V20 of the second direct-current power converter circuit 12 are gradually increased above the source voltage VB by the back electromotive force of the first reactor L1 and the back electromotive force of the second reactor L2, respectively, and the electrical power is supplied to the load 13 and the capacitor 14. Thereby, the capacitor 14 is charged, and the load voltage V0 is gradually increased based on the first and second duties DT1 and DT2.

Moreover, the connection switching control unit 22 performs a switching operation, which gradually decreases the first and second duties DT1 and DT2 to zero. Thereby, an electrical charge charged in the capacitor 14 is supplied to the power source BT while the electrical charge is consumed in the load 13. Thereby, the power source BT is charged, and the load voltage V0 is gradually decreased based on the first and second duties DT1 and DT2. When the first and second duties DT1 and DT2 reach zero, the load voltage V0 is equals the source voltage VB.

(Third Control Mode)

In a third control mode, the connection switching control unit 22 simultaneously drives the first and second direct-current power converter circuits 11 and 12. The phase of the switching operation of the first direct-current power converter circuit 11 is arbitrarily shifted from that of the second direct-current power converter circuit 12 (for example, as illustrated in (A) to (C) of FIG. 4, an opposite phase where a phase shift is 180°). Thereby, the connection switching control unit 22 can control the load voltage V0 to be equal to or more than the source voltage VB. Moreover, a ripple frequency of each current through the load 13, the capacitor 14, and the power source BT can be more than a switching frequency. For example, even if the switching frequency is within an audible band, the connection switching control unit 22 changes a frequency of noise caused by the ripple current, which is generated in the load 13, the capacitor 14, and the power source BT, into one outside the audible band. Thereby, the noise can be suppressed.

In particular, based on the switching operation using the opposite phase, since the ripple of current based on the operation of the first direct-current power converter circuit 11 and that of the second direct-current power converter circuit 12 are superimposed in the opposite phase each other, the ripples of current flowing through the load 13, the capacitor 14, and the power source BT can be reduced in comparison with the second control mode.

Figure 4:
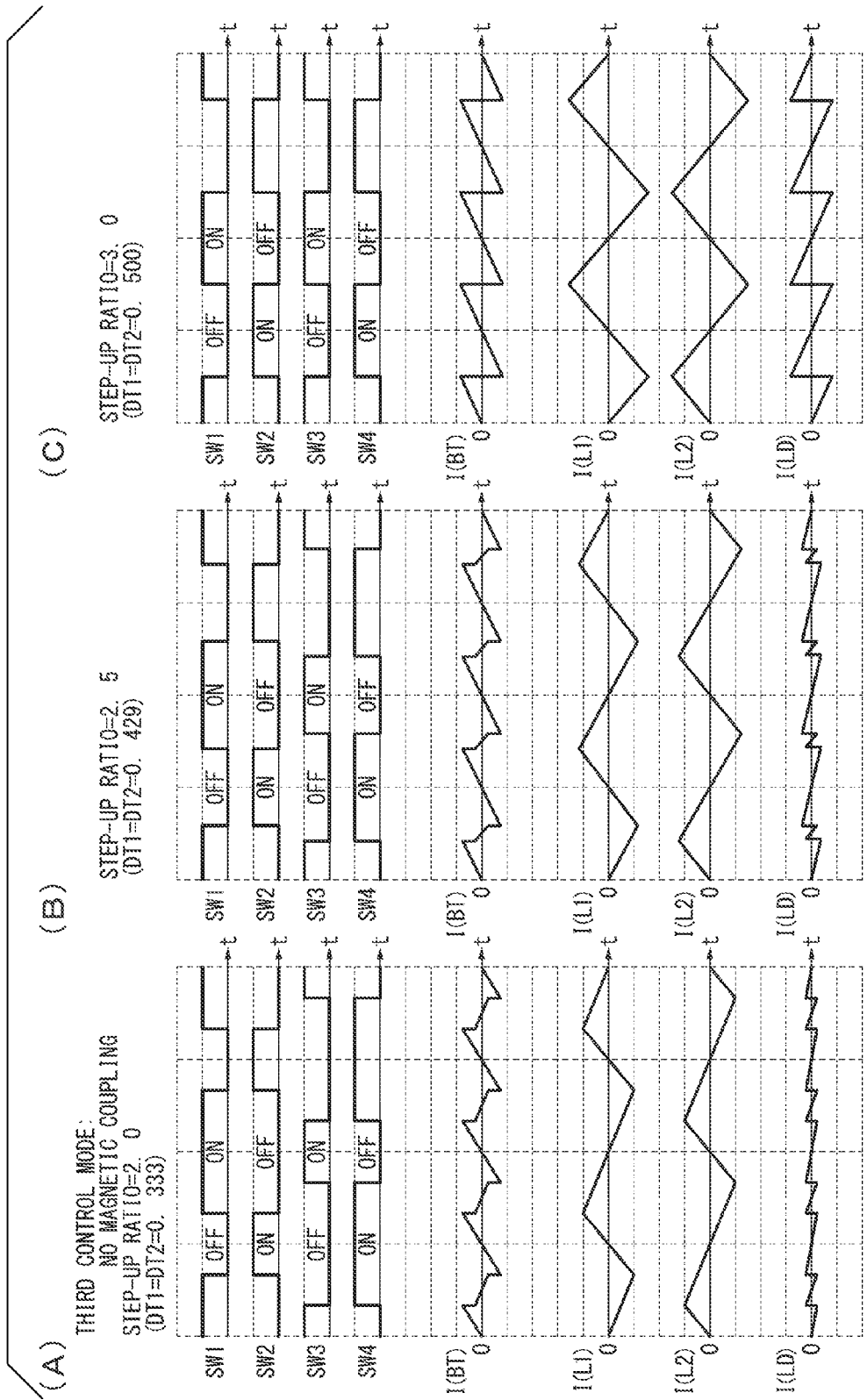
FIG. 4 is a diagram showing ON/OFF of each switching device and a variation of each current when the power device according to the embodiment of the present invention is in a third control mode.

In a current waveform based on a time t illustrated in (A) to (C) of FIG. 4, as illustrated in FIG. 1, a positive direction of a first reactor current I(L1) flowing through the first reactor L1 is from the first node A to the third node C. A positive direction of a second reactor current I(L2) flowing through the second reactor L2 is from the fourth node D to the second node B. A positive direction of a current I(BT) flowing through the power source BT is from the negative electrode to the positive electrode. A positive direction of a summed current I(LD) of currents flowing through the load 13 and the capacitor 14 is from the fifth node E to the sixth node F.

(Fourth Control Mode)

If the first and second reactors L1 and L2 are not magnetically coupled as illustrated in (A) to (C) of FIG. 4 in the third control mode described above, the frequency of each first and second reactor current I(L1) and I(L2) is the same as the switching frequency. On the other hand, if the first and second reactors L1 and L2 are magnetically coupled as illustrated in (A) to (C) of FIG. 5, the frequency of each first and second reactor current I(L1) and I(L2) can be increased above the switching frequency.

Namely, in a fourth control mode, the connection switching control unit 22 simultaneously drives the first and second direct-current power converter circuits 11 and 12 in the condition that the first and second reactors L1 and L2 are magnetically coupled. The phase of the switching operation of the first direct-current power converter circuit 11 is arbitrarily shifted from that of the second direct-current power converter circuit 12 (for example, as illustrated in (A) to (C) of FIG. 5, an opposite phase where a phase shift is 180°).

The first and second reactors L1 and L2 are magnetically coupled by, for example, winding the first and second reactors L1 and L2 around a common core to share a magnetic path. Moreover, the first and second reactors L1 and L2 may be provided by, for example, winding the first and second reactors L1 and L2 around a common core to share a magnetic path in opposite directions each other (reverse phase). Each first reactor current I(L1) and second reactor current I(L2) flows so that magnetizations of the magnetic path are canceled.

Figure 5:
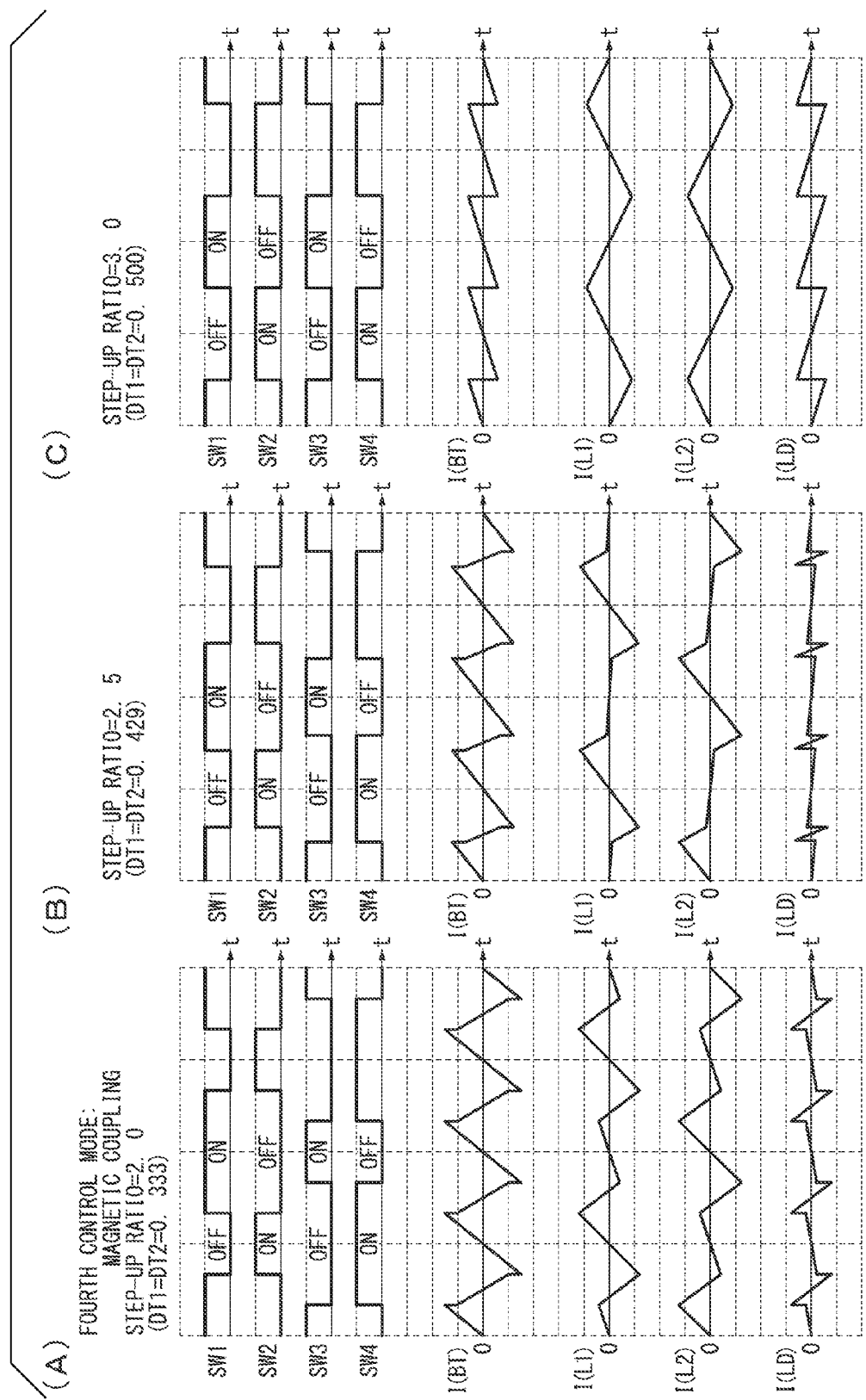
FIG. 5 is a diagram showing ON/OFF of each switching device and a variation of each current when the power device according to the embodiment of the present invention is in a fourth control mode.

For example, as illustrated in (A) to (C) of FIG. 5, in the condition that the first and second reactors L1 and L2 are magnetically coupled, the connection switching control unit 22 increases the first reactor current I(L1) by turning on the second switching device SW2 in the first direct-current power converter circuit 11. Subsequently, by turning off the second switching device SW2, and by turning on the third switching device SW3 in the condition that the first reactor current I(L1) is reduced, the second reactor current I(L2) is increased. Thereby, an inductive voltage caused by the magnetic coupling is generated in the first reactor L1 so that the reduction of the first reactor current I(L1) is suppressed, and the condition of the first reactor current I(L1) is changed from the reduction to the increase, or the reduction of the first reactor current I(L1) is suppressed. Subsequently, by turning off the third switching device SW3, the second reactor current I(L2) is reduced, and the first reactor current I(L1) is reduced.

Moreover, the connection switching control unit 22 increases the second reactor current I(L2) by turning on the third switching device SW3 in the second direct-current power converter circuit 12. Subsequently, by turning off the third switching device SW3, and by turning on the second switching device SW2 in the condition that the second reactor current I(L2) is reduced, the first reactor current I(L1) is increased. Thereby, an inductive voltage caused by the magnetic coupling is generated in the second reactor L2 so that the reduction of the second reactor current I(L2) is suppressed, and the condition of the second reactor current I(L2) is changed from the reduction to the increase, or the reduction of the second reactor current I(L2) is suppressed. Subsequently, by turning off the second switching device SW2, the first reactor current I(L1) is reduced, and the second reactor current I(L2) is reduced.

Thereby, the connection switching control unit 22 increases the frequency of each first and second reactor current I(L1) and I(L2) to the twice of the switching frequency, and a frequency of magnetostrictive noise generated in the first and second reactors L1 and L2 can be increased to outside an audible band.

As described above, the power device 10 according to the embodiment of the present invention can easily control the load voltage V0 to be arbitrary voltage, which is equal to or more than the source voltage VB, by controlling the first duty DT1 and the second duty DT2. In other words, the first direct-current power converter circuit 11 increases the electrical potential difference between the positive electrical potential of the load 13 and the positive electrical potential of the power source BT by the step-up operation, and the second direct-current power converter circuit 12 increases the electrical potential difference between the negative electrical potential of the load 13 and the negative electrical potential of the power source BT by the step-up operation.

Moreover, by simultaneously driving the first and second direct-current power converter circuits 11 and 12 using the switching operation where the phase of the switching operation of the first direct-current power converter circuit 11 is arbitrarily shifted from that of the second direct-current power converter circuit 12, the ripple frequency of each current of the load 13, the capacitor 14, and the power source BT can be more than the switching frequency. Thereby, for example, even if the switching frequency is within an audible band, the connection switching control unit 22 changes a frequency of noise caused by the ripple current, which is generated in the load 13, the capacitor 14, and the power source BT, into a frequency outside the audible band. Thereby, the noise can be suppressed.

Moreover, in the condition that the first and second reactors L1 and L2 are magnetically coupled, by simultaneously driving the first and second direct-current power converter circuits 11 and 12 using the switching operation where the phase of the switching operation of the first direct-current power converter circuit 11 is arbitrarily shifted from that of the second direct-current power converter circuit 12, the frequency of each first and second reactor current I(L1) and I(L2) can be more than the switching frequency. For example, by the opposite phase switching operation, the frequency of each first and second reactor current I(L1) and I(L2) can be increased to the twice of the switching frequency, and a frequency of magnetostrictive noise generated in the first and second reactors L1 and L2 can be increased to outside an audible band.

Moreover, by providing the first and second reactors L1 and L2 to perform a magnetic cancellation, a generation of magnetic saturation in the first and second reactors L1 and L2 is suppressed. Thereby, each element can be reduced in size.

Figure 6:
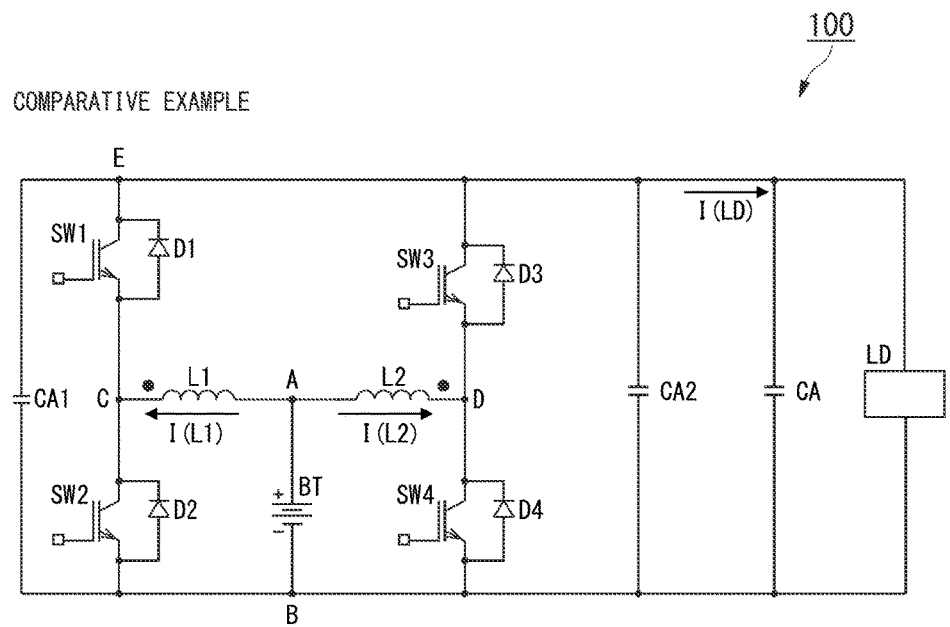
FIG. 6 is a configuration diagram showing a DC-DC converter according to a comparative example of the embodiment of the present invention.

Moreover, for example, given a DC-DC converter 100 disclosed in Japanese Unexamined Patent Application, First Publication No. 2005-224058 as illustrated in FIG. 6 is a comparative example, the power device 10 according to the embodiment of the present invention can reduce the first and second duties DT1 and DT2 needed to achieve a desired step-up ratio in comparison with the comparative example. Moreover, the ripple current can be reduced in a range that the step-up ratio is more than two. Moreover, the voltage resistance of each first and second capacitor CA1 and CA2 needed for the first and second direct-current power converter circuits 11 and 12 can be reduced. Thereby, the entire circuit can be reduced in size.

COMPARATIVE EXAMPLE

The DC-DC converter 100 of the comparative example illustrated in FIG. 6 includes two step-up converters connected with a power source BT in parallel, and first to fifth nodes A to E.

A positive electrode of the power source BT is connected with the first node A, and a negative electrode of the power source BT is connected with the second node B. One end of the first reactor L1 is connected with the third node C, and the other end of the first reactor L1 is connected with the first node A. One end of the second reactor L2 is connected with the fourth node D, and the other end of the second reactor L2 is connected with the first node A.

A collector and an emitter of the first switching device SW1 are connected with the fifth node E and the third node C, respectively. A collector and an emitter of the second switching device SW2 are connected with the third node C and the second node B, respectively. A collector and an emitter of the third switching device SW3 are connected with the fifth node E and the fourth node D, respectively. A collector and an emitter of the fourth switching device SW4 are connected with the fourth node D and the second node B, respectively. Diodes D1 to D4 are connected between the emitter and collector of the switching devices SW1 to SW4, respectively. The direction from the emitter to the collector of each switching device SW1 to SW4 is a forward direction of each diode D1 to D4.

The first and second capacitors CA1 and CA2 are connected between the fifth node E and the second node B.

Figure 7:
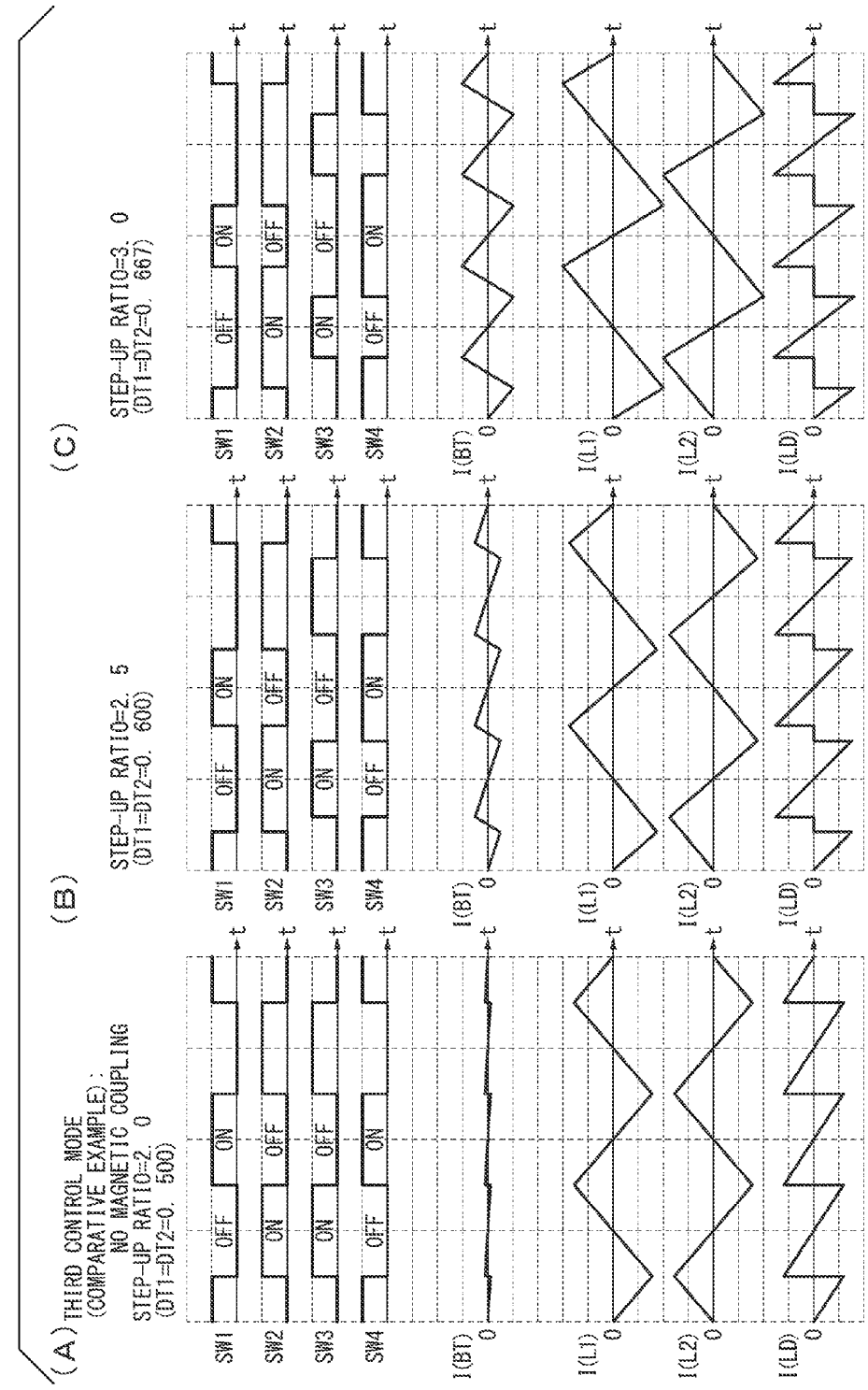
FIG. 7 is a diagram showing ON/OFF of each switching device and a variation of each current when a power device according to the comparative example of the embodiment of the present invention is in a third control mode.
Figure 8:
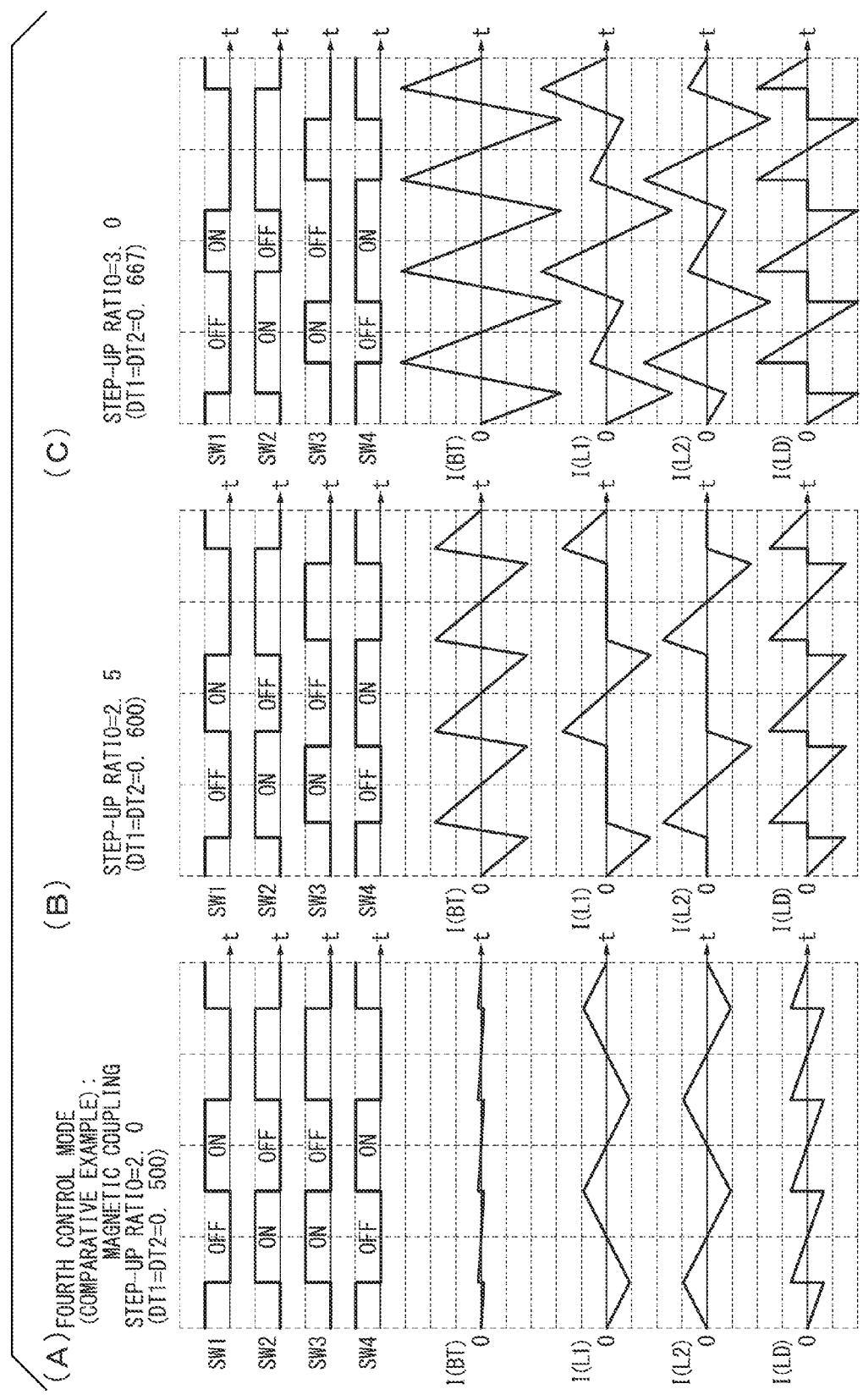
FIG. 8 is a diagram showing ON/OFF of each switching device and a variation of each current when the power device according to the comparative example of the embodiment of the present invention is in a fourth control mode.

A variation of each current I(BT), I(L1), I(L2), and I(LD) is illustrated in (A) to (C) of FIG. 7 and (A) to (C) of FIG. 8 when control operations, which are similar to the third and fourth control mode of the power source 10 according to the embodiment of the present invention described above, are performed in the DC-DC converter 100 of the comparative example illustrated in FIG. 6. In (A) to (C) of FIG. 7 and (A) to (C) of FIG. 8 of the comparative example, step-up ratios, which are the same as those of (A) to (C) of FIG. 4 and (A) to (C) of FIG. 5 of the embodiment of the present invention described above, are set (for example, the step-up rations are 2.0, 2.5, and 3.0).

In a current waveform based on a time t illustrated in (A) to (C) of FIG. 7 and (A) to (C) of FIG. 8, as illustrated in FIG. 6, a positive direction of the first reactor current I(L1) flowing through the first reactor L1 is from the first node A to the third node C. A positive direction of the second reactor current I(L2) flowing through the second reactor L2 is from the first node A to the fourth node D. A positive direction of the current I(BT) flowing through the power source BT is from the negative electrode to the positive electrode. A positive direction of the summed current I(LD) of currents flowing through the load 13 and the capacitor 14 is from the fifth node E to the second node B.

Figure 9:
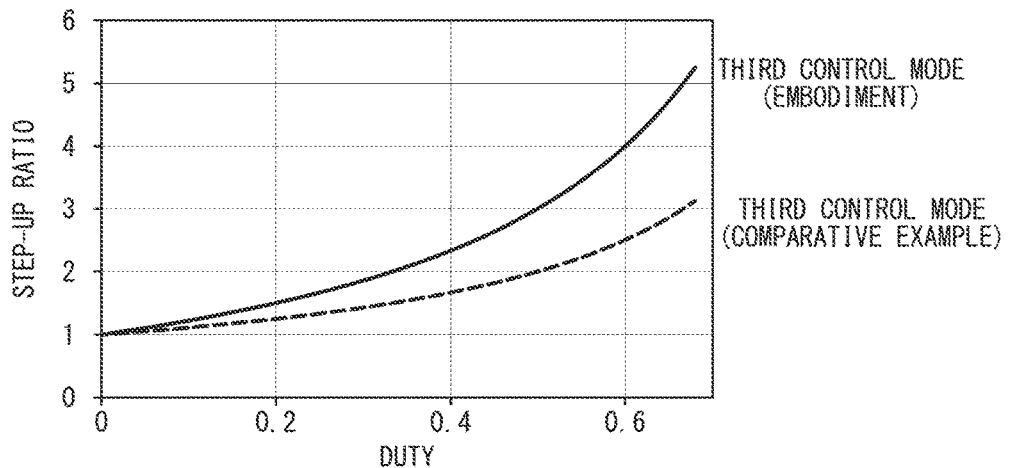
FIG. 9 is a diagram showing a correspondence relationship between a duty (first and second duties) and a step-up ratio when the power device according to the embodiment of the present invention and the DC-DC converter according to the comparative example are in the third control mode.

The load voltage V0 in the embodiment of the present invention is represented by the equation (3) described above, while the load voltage V0 in the comparative example is represented by the following equation (4). Thereby, as illustrated in FIG. 9, according to the embodiment of the present invention, the first and second duties DT1 and DT2 needed to achieve a desired step-up ratio can be reduced in comparison with the comparative example.

$$V0 = \frac{VB}{1 - DT1}, \quad (4)$$

$$(DT1 = DT2)$$

Figure 10:
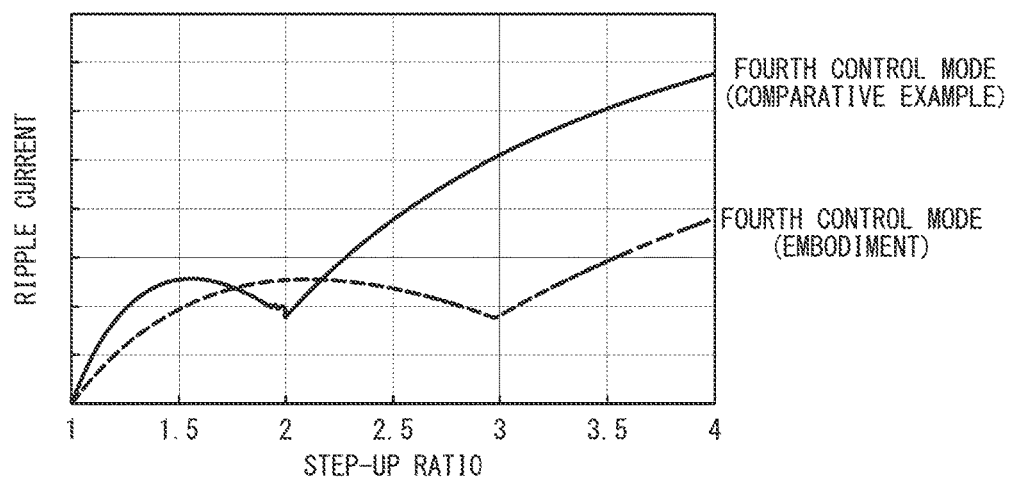
FIG. 10 is a diagram showing a correspondence relationship between the step-up ratio and ripple a current when the power device according to the embodiment of the present invention and the DC-DC converter according to the comparative example are in the fourth control mode.

In the embodiment and the comparative example, when the step-up ratio is increased by increasing the first and second duties DT1 and DT2, the ripple currents flowing through the first and second reactors L1 and L2 are changed so that the ripple currents have an increasing state. In particular, in the range that the first and second duties DT1 and DT2 are more than 0.5, the increase of the ripple current is remarkable. When the first and second duties DT1 and DT2 are more than 0.5, the step-up ratio in the comparative example is more than only two, while the step-up ratio in the embodiment is more than three. Therefore, as illustrated in FIG. 10, according to the embodiment of the present invention, the ripple current in the range that the step-up ratio is more than 2 can be reduced in comparison with the comparative example.

Furthermore, in the comparative example, the entire voltage of load voltage V0 is applied to the first and second capacitors CA1 and CA2. On the other hand, in the embodiment of the present invention, only the output voltages V10 and V20 are applied to the first and second capacitors CA1 and CA2, respectively. Therefore, the voltage resistance needed for the first and second capacitor CA1 and CA2 can be reduced. Thereby, the entire circuit can be reduced in size.

(Variation)

Figure 11:
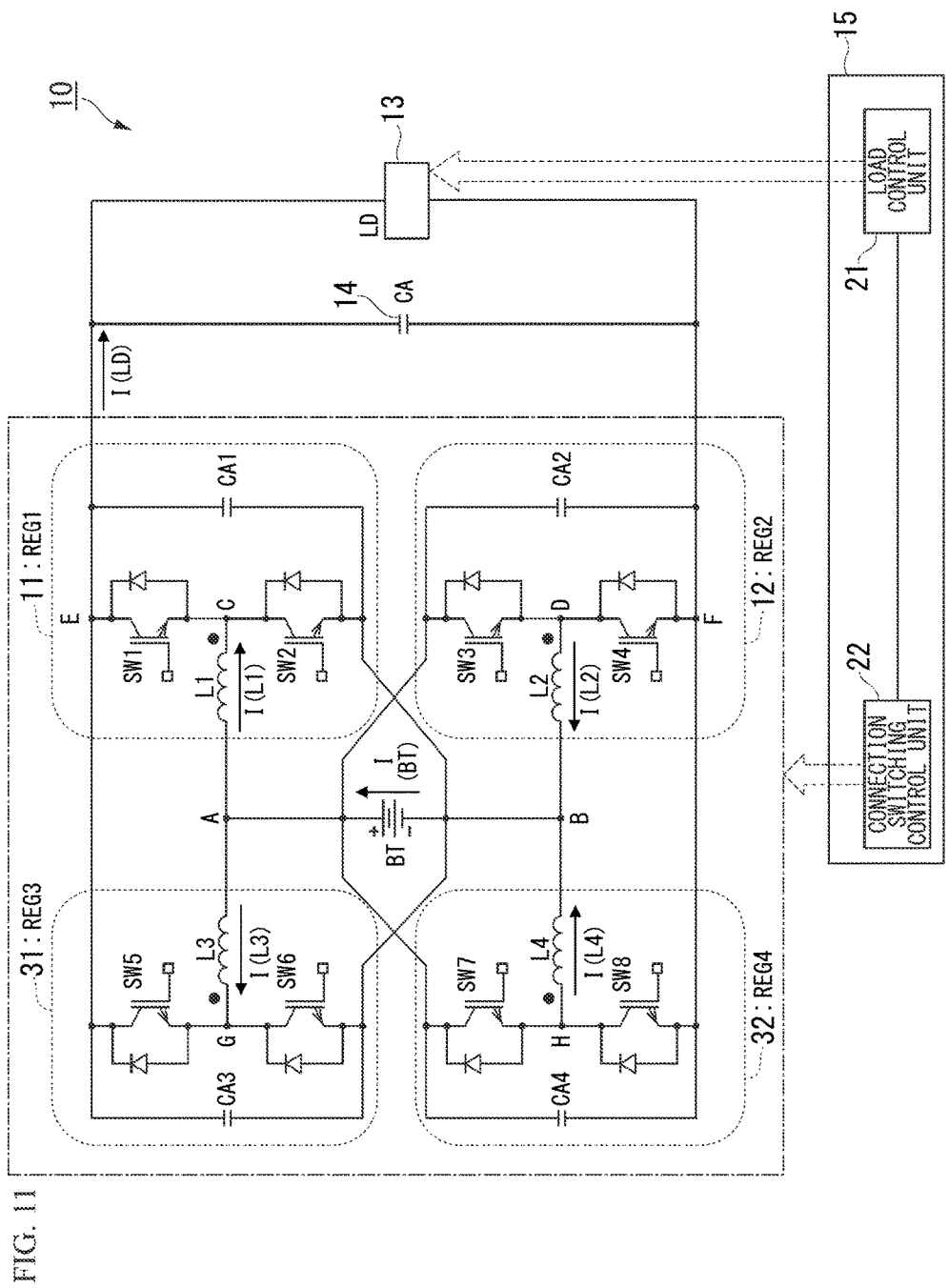
FIG. 11 is a configuration diagram showing a power device according to a variation of the embodiment of the present invention.

As a power device 10 according to a variation illustrated in FIG. 11, the embodiment described above may further include seventh and eighth nodes G and H, a third direct-current power converter circuit (REG3) 31, and a fourth direct-current power converter circuit (REG4) 32.

The third direct-current power converter circuit (REG3) 31 is connected with a power source BT, and include fifth and sixth switching devices SW5 and SW6 such as IGBT (Insulated Gate Bipolar mode Transistor), which configure a third switch group, a third reactor L3, and a third capacitor CA3.

The fourth direct-current power converter circuit (REG4) 32 is connected with the power source BT, and include seventh and eighth switching devices SW7 and SW8 such as IGBT, which configure a fourth switch group, a fourth reactor L4, and a fourth capacitor CA4.

One end of the third reactor L3 is connected with the first node A, and the other end of the third reactor L3 is connected with the seventh node G One end of the fourth reactor L4 is connected with the second node B, and the other end of the fourth reactor L4 is connected with the eighth node H.

A collector and an emitter of the fifth switching device SW5 are connected with the fifth node E and the seventh node G, respectively. A collector and an emitter of the sixth switching device SW6 are connected with the seventh node G and the second node B, respectively. A collector and an emitter of the seventh switching device SW7 are connected with the first node A and the eighth node H, respectively. A collector and an emitter of the eighth switching device SW8 are connected with the eighth node H and the sixth node F, respectively. Diodes D5 to D8 are connected between the emitter and collector of the switching devices SW5 to SW8, respectively. The direction from the emitter to the collector of each switching device SW5 to SW8 is a forward direction of each diode D5 to D8.

The third capacitor CA3 is connected between the fifth node E and the second node B, and the fourth capacitor CA4 is connected between the first node A and the sixth node F.

In this variation, in a similar way to the first and second direct-current power converter circuits 11 and 12, the third and fourth direct-current power converter circuits 31 and 32 are controlled based on pulse-width-modulated signals (PWM signals) output from a control device 15 and input into a gate of each switching device SW5 to SW8 so that the third and fourth direct-current power converter circuits 31 and 32 drive independently from each other.

In the third direct-current power converter circuit 31, when the third capacitor CA3 is charged in a stopped state of a load 13 (in other words, a power consumption and a regeneration are not performed), the fifth switching device SW5 is turned off and the sixth switching device SW6 is turned on. Thereby, the third reactor L3 is excited by flowing a circulating current via the power source BT, the third reactor L3, and the sixth switching device SW6 in series, and a third reactor current I(L3) flowing through the third reactor L3 is increased. On the other hand, by turning on the fifth switching device SW5 and turning off the sixth switching device SW6, a current flows into the third capacitor CA3 via the power source BT, the third reactor L3, and the fifth switching device SW5 and the fifth diode D5.

In the third direct-current power converter circuit 31, when the third capacitor CA3 is discharged in the stopped state of the load 13, the fifth switching device SW5 is turned on and the sixth switching device SW6 is turned off. Thereby, a current flows via the fifth switching device SW5, the third reactor L3, and the power source BT in series. On the other hand, by turning off the fifth switching device SW5 and turning on the sixth switching device SW6, a circulating current flows via the sixth switching device SW6 and the sixth diode D6, the third reactor L3, and the power source BT in series.

In the fourth direct-current power converter circuit 32, when the fourth capacitor CA4 is charged in the stopped state of the load 13, the eighth switching device SW8 is turned off and the seventh switching device SW7 is turned on. Thereby, the fourth reactor L4 is excited by flowing a circulating current via the power source BT, the seventh switching device SW7, and the fourth reactor L4 in series, and a fourth reactor current I(L4) flowing through the fourth reactor L4 is increased. On the other hand, by turning on the eighth switching device SW8 and turning off the seventh switching device SW7, a current flows into the fourth capacitor CA4 via the eighth switching device SW8 and the eighth diode D8, the fourth reactor L4, and the power source BT.

In the fourth direct-current power converter circuit 32, when the fourth capacitor CA4 is discharged in the stopped state of the load 13, the eighth switching device SW8 is turned on and the seventh switching device SW7 is turned off. Thereby, a current flows via the power source BT, the fourth reactor L4, and the eighth switching device SW8 in series. On the other hand, by turning off the eighth switching device SW8 and turning on the seventh switching device SW7, a circulating current flows via the fourth reactor L4, the seventh switching device SW7 and the seventh diode D7, and the power source BT in series.

According the variation, the electrical power covered by each direct-current power converter circuits 11, 12, 31, and 32 can be reduced in comparison with the embodiment described above.

(First Control Mode of the Variation)

In a first control mode, when the connection switching control unit 22 according to the variation simultaneously drives the first to fourth direct-current power converter circuits 11, 12, 31, and 32, the phase of the switching operation of the first direct-current power converter circuit 11 is arbitrarily shifted from that of the second direct-current power converter circuit 12 (for example, an opposite phase where a phase shift is 180°). Moreover, the connection switching control unit 22 drives the third and fourth direct-current power converter circuits 31 and 32, where the phase of the switching operation of the third direct-current power converter circuit 31 is arbitrarily shifted from that of the fourth direct-current power converter circuit 32 (for example, an opposite phase where a phase shift is 180°). Thereby, the connection switching control unit 22 can control the load voltage V0 to be equal to or more than the source voltage VB. Moreover, a ripple frequency of each current of the load 13, the capacitor 14, and the power source BT can be more than a switching frequency. For example, even if the switching frequency is within an audible band, the connection switching control unit 22 changes the frequency of noise caused by the ripple current, which is generated in the load 13, the capacitor 14, and the power source BT, into a frequency outside the audible band. Thereby, the noise can be suppressed.

In particular, according to the switching operation using the opposite phase, since the ripple of current based on the operation of the first direct-current power converter circuit 11 and that of the second direct-current power converter circuit 12 are superimposed in the opposite phase each other, and the ripple of current based on the operation of the third direct-current power converter circuit 31 and that of the fourth direct-current power converter circuit 32 are superimposed in the opposite phase each other, the ripple of current flowing through the load 13, the capacitor 14, and the power source BT can be reduced in comparison with the switching operation using the same phase.

(Second Control Mode of the Variation)

In relation to the first control mode of the variation described above, the connection switching control unit 22 in a second control mode drives the first to fourth direct-current power converter circuits 11, 12, 31, and 32, where the phase of the switching operation of a pair of the first and second direct-current power converter circuits 11 and 12 is arbitrarily shifted from that of a pair of the third and fourth direct-current power converter circuits 31 and 32 (for example, a phase where a phase shift is 90°). Thereby, the ripple frequency of each current of the load 13, the capacitor 14, and the power source BT can be increased.

(Third Control Mode of the Variation)

In the second control mode of the variation described above, if the first and second reactors L1 and L2 are magnetically coupled and the third and fourth reactors L3 and L4 are magnetically coupled, the frequency of each first to fourth reactor current I(L1) to I(L4) can be increased more than the switching frequency. Moreover, the first and second reactors L1 and L2 may be provided to perform a magnetic-field cancellation, and the third and fourth reactors L3 and L4 may be provided to perform a magnetic-field cancellation.

Namely, in a third control mode, the connection switching control unit 22 sets the first to fourth direct-current power converter circuits 11, 12, 31, and 32 in a condition that the first and second reactors L1 and L2 are magnetically coupled and the third and fourth reactors L3 and L4 are magnetically coupled so that the phase of the switching operation of the first direct-current power converter circuit 11 is arbitrarily shifted from that of the second direct-current power converter circuit 12 and that the phase of the switching operation of the third direct-current power converter circuit 31 is arbitrarily shifted from that of the fourth direct-current power converter circuit 32. Moreover, the connection switching control unit 22 sets the first to fourth direct-current power converter circuits 11, 12, 31, and 32 so that the phase of the switching operation of a pair of the first and second direct-current power converter circuits 11 and 12 is arbitrarily shifted from that of a pair of the third and fourth direct-current power converter circuits 31 and 32.

In particular, the phase of the switching operation of the first direct-current power converter circuit 11 is opposite to that of the second direct-current power converter circuit 12, the phase of the switching operation of the third direct-current power converter circuit 31 is opposite to that of the fourth direct-current power converter circuit 32, and a phase shift of the switching operation of the pair of the first and second direct-current power converter circuits 11 and 12 and the switching operation of the pair of the third and fourth direct-current power converter circuits 31 and 32 is 90°. Thereby, the ripple frequency of each current of the load 13, the capacitor 14, and the power source BT can be increased to the four times of the switching frequency, and a frequency of noise caused by the ripple current, which is generated in the load 13, the capacitor 14, and the power source BT, can be increased to outside an audible band.

(Fourth Control Mode of the Variation)

In a fourth mode, when the connection switching control unit 22 according to the variation simultaneously drives the first to fourth direct-current power converter circuits 11, 12, 31, and 32, where the phase of the switching operation of the first direct-current power converter circuit 11 is arbitrarily shifted from that of the third direct-current power converter circuit 31 (for example, an opposite phase where a phase shift is 180°). Moreover, the connection switching control unit 22 drives the second and fourth direct-current power converter circuits 12 and 32, where the phase of the switching operation of the second direct-current power converter circuit 12 is arbitrarily shifted from that of the fourth direct-current power converter circuit 32 (for example, an opposite phase where a phase shift is 180°). Thereby, the connection switching control unit 22 can control the load voltage V0 to be equal to or more than the source voltage VB. Moreover, a ripple frequency of each current of the load 13, the capacitor 14, and the power source BT can be more than a switching frequency. For example, even if the switching frequency is within an audible band, the connection switching control unit 22 changes the frequency of noise caused by the ripple current, which is generated in the load 13, the capacitor 14, and the power source BT, into a frequency outside the audible band. Thereby, the noise can be suppressed.

In particular, based on the switching operation using the opposite phase, since the ripple of current based on the operation of the first direct-current power converter circuit 11 and that of the third direct-current power converter circuit 31 are superimposed in the opposite phase each other, and the ripple of current based on the operation of the second direct-current power converter circuit 12 and that of the fourth direct-current power converter circuits 32 are superimposed in the opposite phase each other, the ripple of current flowing through the load 13, the capacitor 14, and the power source BT can be reduced in comparison with the switching operation using the same phase.

(Fifth Control Mode of the Variation)

In relation to the fourth control mode of the variation described above, in a fifth mode, the connection switching control unit 22 drives the first to fourth direct-current power converter circuits 11, 12, 31 and 32, where the phase of the switching operation of the pair of the first and third direct-current power converter circuits 11 and 31 is arbitrarily shifted from that of the pair of the second and fourth direct-current power converter circuits 12 and 32 (for example, a phase shift is 90°). Thereby, a ripple frequency of each current of the load 13, the capacitor 14, and the power source BT can be increased.

(Sixth Control Mode of the Variation)

In the fifth control mode of the variation described above, if the first and third reactors L1 and L3 are magnetically coupled and the second and fourth reactors L2 and L4 are magnetically coupled, the frequency of each first to fourth reactor currents I(L1) to I(L4) can be increased more than a switching frequency. Moreover, the first and third reactors L1 and L3 may be provided to perform a magnetic-field cancellation, and the second and fourth reactors L2 and L4 may be provided to perform a magnetic-field cancellation.

Namely, in a sixth control mode, the connection switching control unit 22 sets the first to fourth direct-current power converter circuits 11, 12, 31, and 32 in the condition that the first and third reactors L1 and L3 are magnetically coupled and the second and fourth reactors L2 and L4 are magnetically coupled so that the phase of the switching operation of the first direct-current power converter circuit 11 is arbitrarily shifted from that of the third direct-current power converter circuit 31, and that the phase of the switching operation of the second direct-current power converter circuit 12 is arbitrarily shifted from that of the fourth direct-current power converter circuit 32. Moreover, the connection switching control unit 22 sets the first to fourth direct-current power converter circuits 11, 12, 31, and 32 so that the phase of the switching operation of the pair of the first and third direct-current power converter circuits 11 and 31 is arbitrarily shifted from that of the pair of the second and fourth direct-current power converter circuits 12 and 32.

In particular, the phase of the switching operation of the first direct-current power converter circuit 11 is opposite to that of the third direct-current power converter circuit 31, the phase of the switching operation of the second direct-current power converter circuit 12 is opposite to that of the fourth direct-current power converter circuit 32, and a phase shift of the switching operation of the pair of the first and third direct-current power converter circuits 11 and 31 and the switching operation of the pair of the second and fourth direct-current power converter circuits 12 and 32 is 90°. Thereby, the ripple frequency of each current of the load 13, the capacitor 14, and the power source BT can be increased to the four times of the switching frequency, and a frequency of noise caused by the ripple current, which is generated in the load 13, the capacitor 14, and the power source BT, can be increased to outside an audible band.

The technical scope of the present invention is not limited to the embodiments described above, and includes variations where a variety of modifications are made in the embodiments described above without departing from the spirit or scope of the present invention. In other words, the embodiments described above are illustrative only, and modifications may be made accordingly in the embodiments.

For example, the power source BT is not limited to a dischargeable and chargeable battery. The power source 13T may be a fuel cell or a power generator which is only capable of discharging power. In this case, the first and fourth switching devices SW1 and SW4 of the embodiment described above and the first, fourth, fifth, and eighth switching devices SW1, SW4, SW5, and SW8 of the variation of the embodiment described above may be replaced with a diode (in other words, a switch which can be electrically conducted in a forward direction by applying a forward direction voltage) to interrupt the charge from the load 13 to the source power BT.

What is claimed is:

1. A power device, comprising:
a power source;
a load configured to be driven by power supplied from the power source; and
a voltage control unit configured to control a voltage to be applied to the load, the voltage control unit comprising:
a first reactor and a second reactor;
a plurality of switches;
a first capacitor and a second capacitor; and
a first step-up circuit and a second step-up circuit,
a positive electrode of the power source being connected with a first node,
a negative electrode of the power source being connected with a second node,
a first end of the first reactor being connected with a third node and a second end of the first reactor being connected with the first node,
a first end of the second reactor being connected with a fourth node and a second end of the second reactor being connected with the second node,
a first end of the first capacitor being connected with a fifth node and a second end of the first capacitor being connected with the second node,
a first end of the second capacitor being connected with a sixth node and a second end of the second capacitor being connected with the first node,
the switches comprising:
a first switch, a first end of the first switch being connected with the fifth node and a second end of the first switch being connected with the third node;
a second switch, a first end of the second switch being connected with the third node and a second end of the second switch being connected with the second node;
a third switch, a first end of the third switch being connected with the first node and a second end of the third switch being connected with the fourth node; and
a fourth switch, a first end of the fourth switch being connected with the fourth node and a second end of the fourth switch being connected with the sixth node,
the first step-up circuit comprising the first reactor, the first capacitor, and the first and second switches, the first step-up circuit being connected with the power source;
the second step-up circuit comprising the second reactor, the second capacitor, and the third and fourth switches, the second step-up circuit being connected with the power source; and
the voltage control unit being configured to control the voltage applied to the load to be an arbitrary voltage, which is equal to or more than the voltage of the power source, based on a duty of ON and OFF switching operation of the switch.

2. The power device according to claim 1, wherein the voltage control unit is configured to perform a first switching operation and a second switching operation such that a phase shift is provided between the first and second switching operations, the first switching operation being that the first switch and the second switch of the first step-up circuit are inverted and alternative ON and OFF operations of each first and second switch are performed, and the second switching operation being that the third switch and the fourth switch of the second step-up circuit are inverted and alternative ON and OFF operations of each third and fourth switch are performed.

3. The power device according to claim 1, wherein the first reactor and the second reactor are magnetically coupled.

4. The power device according to claim 3, wherein the first reactor and the second reactor are provided to perform a magnetic-field cancellation.

5. The power device according to claim 1, wherein the first and fourth switches are configured to interrupt a conduction for charging the power source.

6. The power device according to claim 1, wherein the voltage control unit further comprises:
a third reactor and a fourth reactor;
a third capacitor and a fourth capacitor; and
a third step-up circuit and a fourth step-up circuit,
a first end of the third reactor being connected with a seventh node and a second end of the third reactor being connected with the first node,
a first end of the fourth reactor being connected with an eighth node and a second end of the fourth reactor being connected with the second node,
a first end of the third capacitor being connected with the fifth node and a second end of the third capacitor being connected with the second node,
a first end of the fourth capacitor being connected with the sixth node and a second end of the fourth capacitor being connected with the first node,
the switches further comprising:
a fifth switch, a first end of the fifth switch being connected with the fifth node and a second end of the fifth switch being connected with the seventh node;
a sixth switch, a first end of the sixth switch being connected with the seventh node and a second end of the sixth switch being connected with the second node;
a seventh switch, a first end of the seventh switch being connected with the first node and a second end of the seventh switch being connected with the eighth node; and
an eighth switch, a first end of the eighth switch being connected with the eighth node and a second end of the eighth switch being connected with the sixth node,
the third step-up circuit comprising the third reactor, the third capacitor, and the fifth and sixth switches, the third step-up circuit being connected with the power source, and
the fourth step-up circuit comprising the fourth reactor, the fourth capacitor, and the seventh and eighth switches, the fourth step-up circuit being connected with the power source.

7. The power device according to claim 6, wherein the voltage control unit is configured to perform first to fourth switching operations such that a phase shift is provided between the first and second switching operations and a phase shift is provided between the third and fourth switching operations, the first switching operation being that the first switch and the second switch of the first step-up circuit are inverted and alternative ON and OFF operations of each first and second switch are performed, the second switching operation being that the third switch and the fourth switch of the second step-up circuit are inverted and alternative ON and OFF operations of each third and fourth switch are performed, the third switching operation being that the fifth switch and the sixth switch of the third step-up circuit are inverted and alternative ON and OFF operations of each fifth and sixth switch are performed, the fourth switching operation being that the seventh switch and the eighth switch of the fourth step-up circuit are inverted and alternative ON and OFF operations of each seventh and eighth switch are performed.

8. The power device according to claim 7, wherein the voltage control unit is configured to perform the first to fourth switching operations such that a phase shift is provided between a pair of the first and second switching operations and a pair of the third and fourth switching operations.

9. The power device according to claim 7, wherein the first reactor and the second reactor are magnetically coupled, and the third reactor and the fourth reactor are magnetically coupled.

10. The power device according to claim 9, wherein the first reactor and the second reactor are provided to perform a magnetic-field cancellation, and the third reactor and the fourth reactor are provided to perform a magnetic-field cancellation.

11. The power device according to claim 6, wherein the voltage control unit is configured to perform first to fourth switching operations such that a phase shift is provided between the first and third switching operations and a phase shift is provided between the second and fourth switching operations, the first switching operation being that the first switch and the second switch of the first step-up circuit are inverted and alternative ON and OFF operations of each first and second switch are performed, the second switching operation being that the third switch and the fourth switch of the second step-up circuit are inverted and alternative ON and OFF operations of each third and fourth switch are performed, the third switching operation being that the fifth switch and the sixth switch of the third step-up circuit are inverted and alternative ON and OFF operations of each fifth and sixth switch are performed, the fourth switching operation being that the seventh switch and the eighth switch of the fourth step-up circuit are inverted and alternative ON and OFF operations of each seventh and eighth switch are performed.

12. The power device according to claim 11, wherein the voltage control unit is configured to perform the first to fourth switching operations such that a phase shift is provided between a pair of the first and third switching operations and a pair of the second and fourth switching operations.

13. The power device according to claim 11, wherein the first reactor and the third reactor are magnetically coupled, and the second reactor and the fourth reactor are magnetically coupled.

14. The power device according to claim 13, wherein the first reactor and the third reactor are provided to perform a magnetic-field cancellation, and the second reactor and the fourth reactor are provided to perform a magnetic-field cancellation.

15. The power device according to claim 6, wherein the first, fourth, fifth, and eighth switches are configured to interrupt a conduction for charging the power source.

* * * * *